United States Patent
Marzorati et al.

(10) Patent No.: US 12,307,461 B2
(45) Date of Patent: May 20, 2025

(54) AUGMENTED USER AUTHENTICATION

(71) Applicant: Kyndryl, Inc., New York, NY (US)

(72) Inventors: Mauro Marzorati, Lutz, FL (US); Paul Llamas Virgen, Zapopan (MX); Priyansh Jaiswal, Boca Raton, FL (US); Peeyush Jaiswal, Boca Raton, FL (US)

(73) Assignee: Kyndryl, Inc., New York, NY (US)

( * ) Notice: Subject to any disclaimer, the term of this patent is extended or adjusted under 35 U.S.C. 154(b) by 165 days.

(21) Appl. No.: 17/591,315

(22) Filed: Feb. 2, 2022

(65) Prior Publication Data
US 2023/0245127 A1  Aug. 3, 2023

(51) Int. Cl.
*G06Q 20/40* (2012.01)
*G06V 10/75* (2022.01)
*G06V 40/16* (2022.01)

(52) U.S. Cl.
CPC ..... *G06Q 20/40145* (2013.01); *G06V 10/757* (2022.01); *G06V 40/168* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 8,660,322 B2 | 2/2014 | Tsai et al. | |
| 8,917,913 B2 * | 12/2014 | Kritt | G06V 20/30 382/118 |

(Continued)

FOREIGN PATENT DOCUMENTS

| | | |
|---|---|---|
| CN | 111460962 | 7/2020 |
| CN | 112418177 | 2/2021 |

(Continued)

OTHER PUBLICATIONS

Google Patents English language translation of DE-102013102399-A1. https://patents.google.com/patent/DE102013102399A1/en?oq=DE+102013102399+A1 (Year: 2024).*
Mell et al., "The NIST Definition of Cloud Computing", NIST, Special Publication 800-145, Sep. 2011, 7 pages.

*Primary Examiner* — Ayal I. Sharon
(74) *Attorney, Agent, or Firm* — Erik Swanson; Andrew M. Calderon; Calderon Safran & Wright P.C.

(57) ABSTRACT

A computer-implemented method includes: setting up, by a computing device, an identification profile by capturing a first image using a camera of the computing device; requesting, by the computing device, an authentication action by an authentication device; comparing, by the computing device, recognized elements of the first image and a second image, the recognized elements of the first image and the second image including at least one of ephemeral features and transient features; determining, by the computing device, whether a confidence level is above a predetermined threshold based on a comparison of the recognized elements of the first image and the second image; and completing, by the computing device, authentication of the computing device with the authentication device in response to a determination that the confidence level is above the predetermined threshold.

20 Claims, 9 Drawing Sheets

(56) References Cited

U.S. PATENT DOCUMENTS

| | | | |
|---|---|---|---|
| 8,941,741 B1* | 1/2015 | McDonough | G06F 21/36 |
| | | | 348/161 |
| 8,973,154 B2 | 3/2015 | Yanagihara | |
| 9,082,235 B2* | 7/2015 | Lau | G06V 40/171 |
| 9,218,813 B2* | 12/2015 | Baldwin | H04L 9/3231 |
| 9,898,649 B2 | 2/2018 | Wang et al. | |
| 10,163,042 B2* | 12/2018 | Cheng | G06V 20/30 |
| 11,527,107 B1* | 12/2022 | Mostafa | G06V 10/751 |
| 2003/0118216 A1* | 6/2003 | Goldberg | H04N 1/00137 |
| | | | 707/E17.026 |
| 2009/0185723 A1* | 7/2009 | Kurtz | G06V 40/50 |
| | | | 382/118 |
| 2011/0038512 A1* | 2/2011 | Petrou | G06F 16/532 |
| | | | 382/118 |
| 2013/0051632 A1 | 2/2013 | Tsai et al. | |
| 2015/0281200 A1* | 10/2015 | Steeves | G06F 21/32 |
| | | | 726/6 |
| 2019/0251571 A1* | 8/2019 | O'Reilly | G06V 40/168 |
| 2019/0370533 A1 | 12/2019 | Han et al. | |
| 2020/0134151 A1* | 4/2020 | Magi | G06F 21/35 |
| 2020/0143032 A1* | 5/2020 | Horstmeyer | G02B 21/06 |
| 2021/0319098 A1* | 10/2021 | Pogorelik | G06N 20/00 |
| 2022/0027844 A1* | 1/2022 | Miller | G06Q 10/0833 |
| 2023/0135312 A1* | 5/2023 | Decrop | G01S 17/88 |
| | | | 348/14.08 |

FOREIGN PATENT DOCUMENTS

| | | | | |
|---|---|---|---|---|
| DE | 102013102399 A1 * | 9/2013 | | G06F 21/32 |
| ES | 2632266 T3 | 9/2017 | | |
| IN | 202021030890 | 8/2020 | | |
| JP | 2018517448 | 7/2018 | | |
| WO | WO-2017176876 A1 * | 10/2017 | | G05B 15/02 |
| WO | 2019236284 | 12/2019 | | |

\* cited by examiner

AUGMENTED USER AUTHENTICATION

BACKGROUND

Aspects of the present invention relate generally to augmented user authentication and, more particularly, to augmented user authentication based on a presence of adjunct signals.

A process of recognizing a previous interaction or an acquaintance involves a processing of a plurality of signals. The plurality of signals includes ephemeral signals (glasses, facial hair, clothing style), transient signals (the actual clothing worn on a day), and permanent signals (male vs. female, face geometry, etc.).

SUMMARY

In a first aspect of the invention, there is a computer-implemented method including: setting up, by a computing device, an identification profile by capturing a first image using a camera of the computing device; requesting, by the computing device, an authentication action by an authentication device; comparing, by the computing device, recognized elements of the first image and a second image, the recognized elements of the first image and the second image including at least one of ephemeral features and transient features; determining, by the computing device, whether a confidence level is above a predetermined threshold based on a comparison of the recognized elements of the first image and the second image; and completing, by the computing device, authentication of the computing device with the authentication device in response to a determination that the confidence level is above the predetermined threshold.

In another aspect of the invention, there is a computer program product including one or more computer readable storage media having program instructions collectively stored on the one or more computer readable storage media. The program instructions are executable to: set up an identification profile by capturing a first image using a camera of a computing device, request an authentication action by an authentication device; compare recognized elements of the first image and a second image, the recognized elements of the first image and the second image including at least one of ephemeral features and transient features; determine whether a confidence level is above a predetermined threshold based on a comparison of the recognized elements of the first image and the second image; and complete authentication of the computing device with the authentication device in response to a determination that the confidence level is above the predetermined threshold.

In another aspect of the invention, there is system including a processor, a computer readable memory, one or more computer readable storage media, and program instructions collectively stored on the one or more computer readable storage media. The program instructions are executable to: set up an identification profile by capturing a first image using a camera of a computing device, request an authentication action by an authentication device; compare recognized elements of the first image and a second image, the recognized elements of the first image and the second image including at least one of ephemeral features and transient features; determine whether a confidence level is above a predetermined threshold based on a comparison of the recognized elements of the first image and the second image; and complete authentication of the computing device with the authentication device in response to a determination that the confidence level is above the predetermined threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
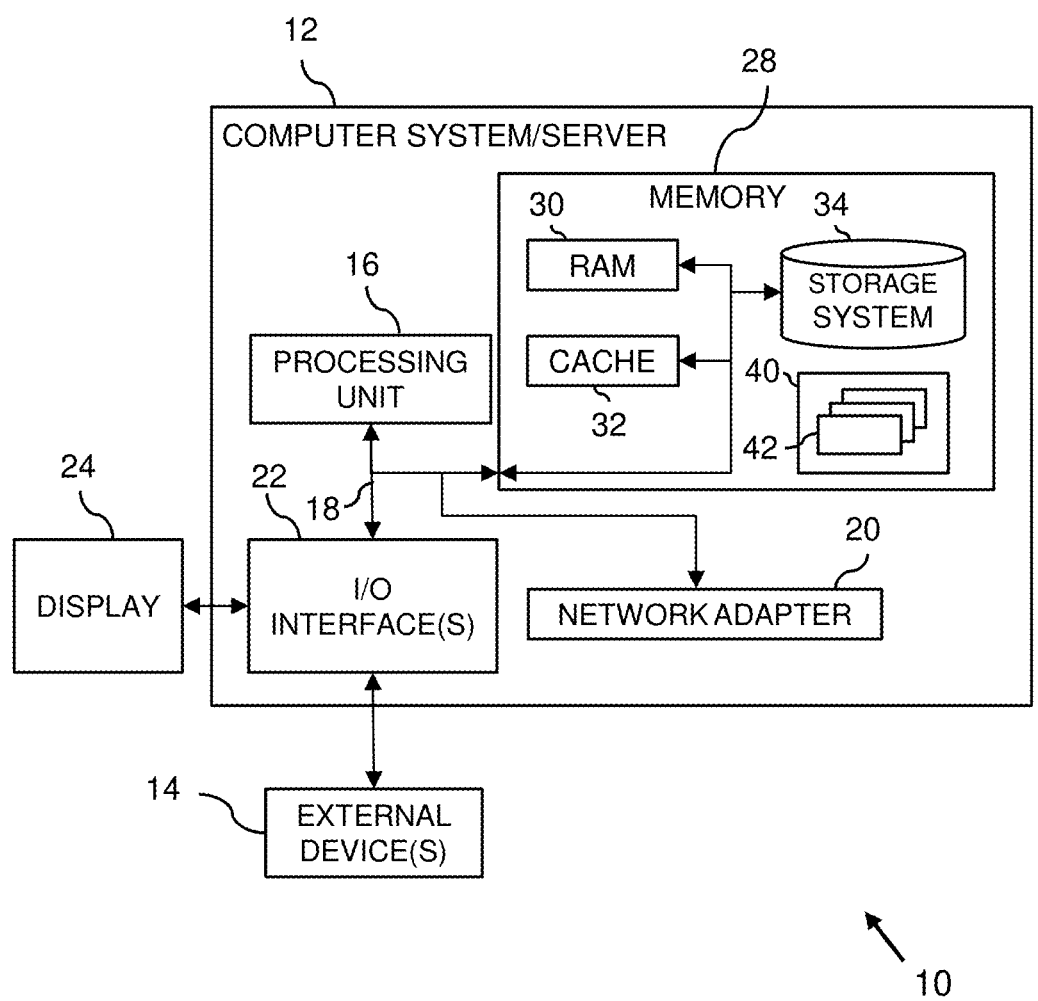
FIG. 1 depicts a cloud computing node according to an embodiment of the present invention.

Aspects of the present invention relate generally to augmented user authentication and, more particularly, to augmented user authentication based on a presence of adjunct signals (i.e., features). As used herein, the term signals (e.g., adjunct signals, permanent signals, transient signals, ephemeral signals, personal signals, etc.) refers to features such as permanent features, transient features, ephemeral features, personal features, etc. In an example, systems may rely on permanent signals for a positive match of user authentication. However, such systems are limited because they can't accurately perform user authentication if the permanent signals are obscured (e.g., covered by a mask or clothing). As an example, social distancing and isolation require masked faces, which render known methods of facial recognition invalid unless the user exposes themselves to potential pathogens. For example, similar to how IBM Watson® has a process of submitting an answer if relatively sure, there is a paradigm shift to incorporate a preponderance of ephemeral and transient signals and supplement a lack of permanent signals for a user authentication process.

Aspects of the present invention address the above-mentioned problems by enabling best-effort recognition of an authorized user from a plurality of signals of varying degrees of permanence, e.g., the clothes worn, hair style, etc., when permanent signals are not available, e.g., covered/masked mouth and/or covered/masked nose. In other words, aspects of the present invention de-emphasize exclusive reliance of facial features to establish authorization. Further, aspects of the invention include a mechanism for detecting clustering personal signals configuration used for authorization mechanisms based on the idea that a person can have different personal signals (i.e., features) which conforms clustering signals and a person can have different clustering configuration during the time to live window. Aspects of the present invention include the introduction of best-effort, varying confidence level from available signals, which draws a parallel to cognitive computing as different from deterministic computing practices. Aspects of the present invention also include time-based tokens (TOTP) as added signals.

According to an aspect of the invention, there is a computer-implemented process for using facial recognition for access to a resource, the computer-implemented method including: obtaining a baseline image of a user, the baseline image of the user including permanent features and non-permanent features; obtaining an authentication image of the user at a later time; and authenticating the user based on a comparison of the images, wherein both of the permanent features and non-permanent features are used in the comparison, with permanent features weighted more heavily in the comparison. Further, the permanent features may include a distance between eyes and non-permanent features include a hat color, earring shape, and hair length. The non-permanent features may include ephemeral features and transient features. The baseline image may have a short time to live (TTL) of less than twenty-four hours. The relative weighting of non-permanent features may vary depending on the permanence-level of the feature and the time since the baseline image was captured. In an example, a hair-length is weighted heavily for one-week and a hair color is only weighted heavily for twelve hours.

Implementations of the invention provide an improvement in the technical field of user authentication by enabling best-effort recognition of an authorized user from a plurality of signals of varying degrees of permanence, e.g., the clothes worn, hair style, etc., when permanent signals are not available, e.g., covered/masked mouth and/or covered/masked nose. Implementations of the invention provide an improvement in the technical field of user authentication by detecting clustering personal signals configuration used for authorization mechanisms based on the idea that a person can have different personal signals which conforms clustering signals and a person can have different clustering configuration during a time to live window. Implementations of the invention provide an improvement in the technical field of user authentication by utilizing artificial intelligence (AI) and machine learning algorithms with prior authorization signals when determining a level of confidence for authentication.

It should be understood that, to the extent implementations of the invention collect, store, or employ personal information provided by, or obtained from, individuals (for example, user image elements), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
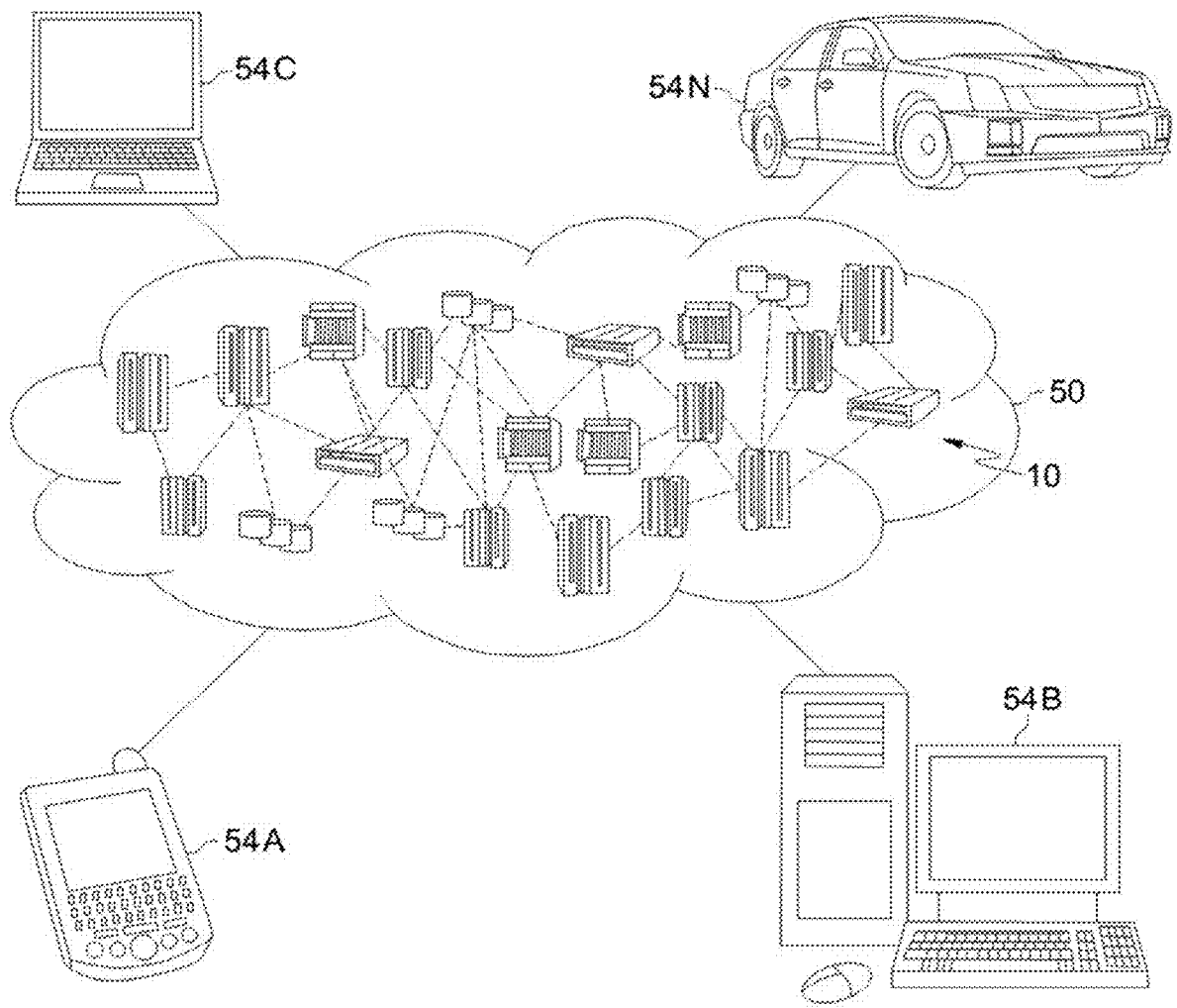
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
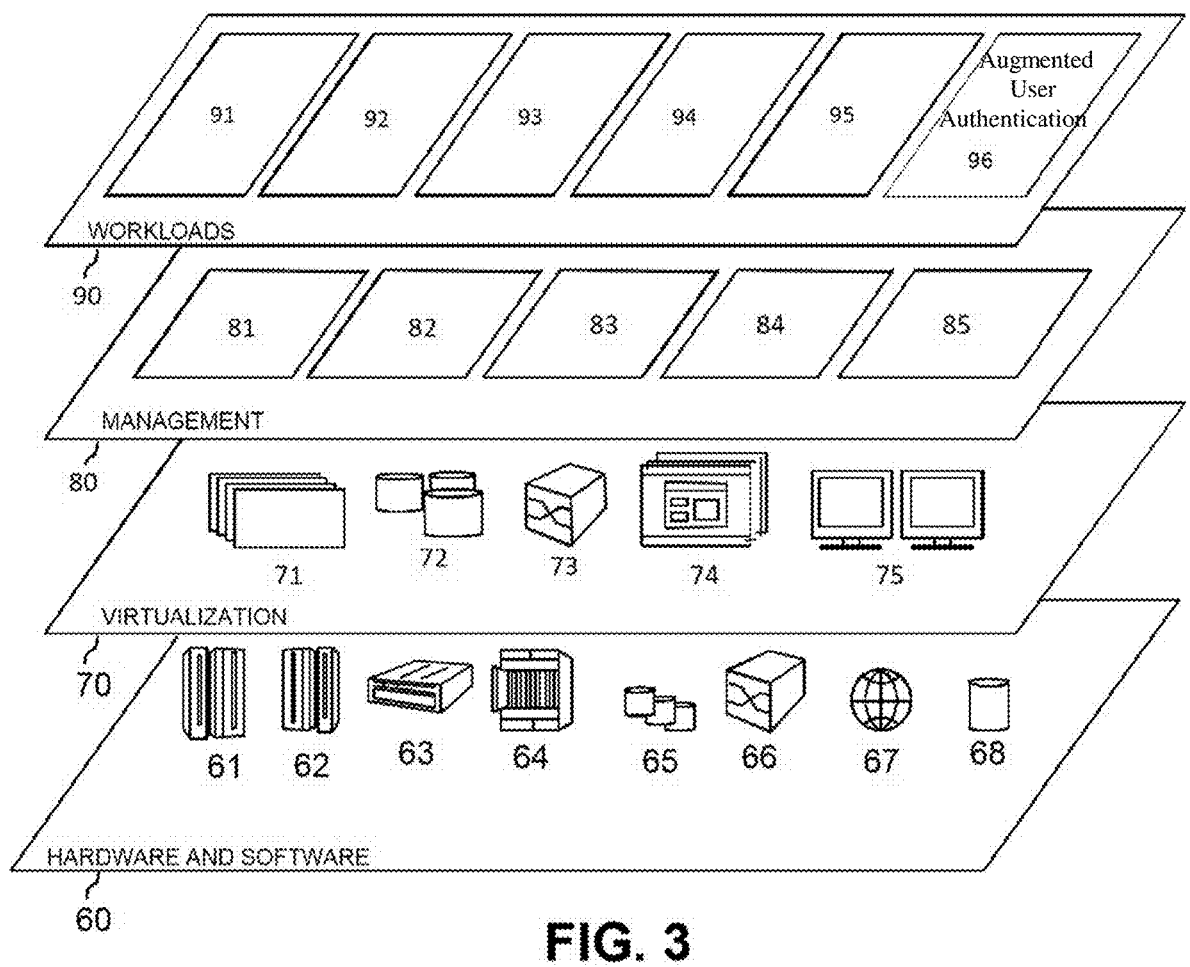
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented user authentication 96.

Implementations of the invention may include a computer system/server 12 of FIG. 1 in which one or more of the program modules 42 are configured to perform (or cause the computer system/server 12 to perform) one of more functions of the augmented user authentication 96 of FIG. 3. For example, the one or more of the program modules 42 may be configured to: setting up an identification profile by capturing a first image using a camera of a computing device; requesting an authentication action by an authentication device; comparing recognized elements of the first image and a second image, the recognized elements of the first image and the second image including at least one of ephemeral features and transient features; determining whether a confidence level is above a predetermined threshold based on a comparison of the recognized elements of the first image and the second image; and completing authentication of the computing device with the authentication device in response to a determination that the confidence level is above the predetermined threshold.

Figure 4:
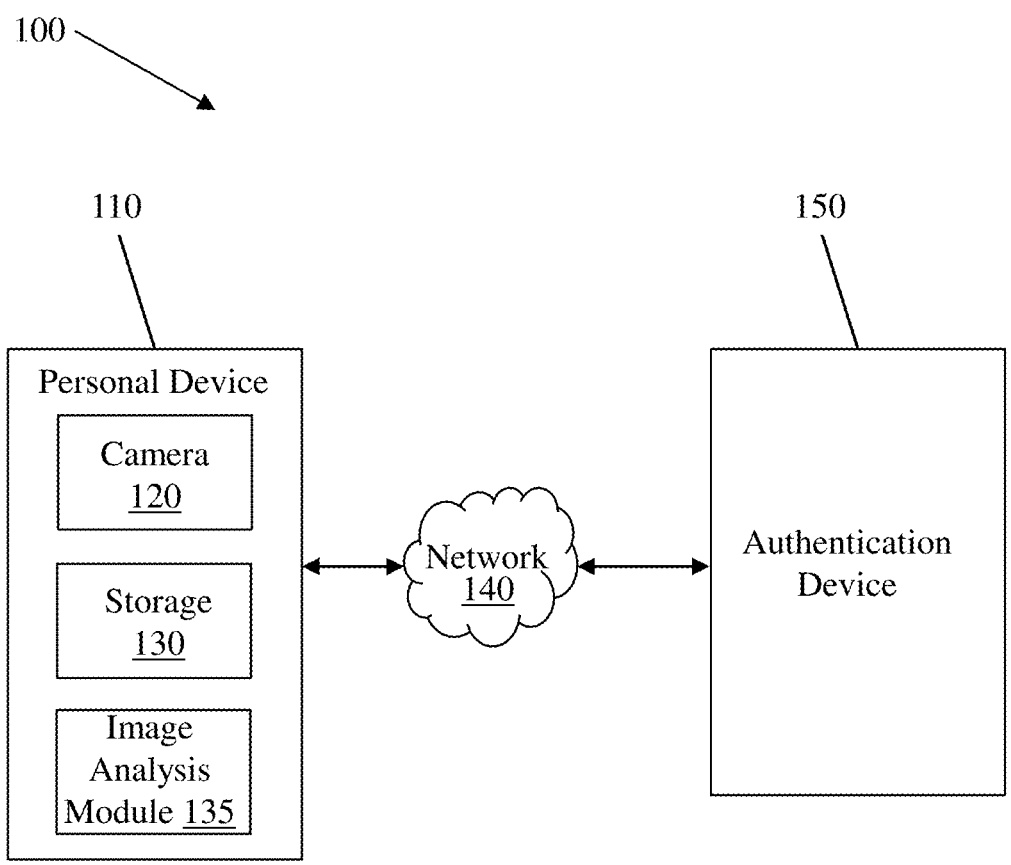
FIG. 4 shows a block diagram of an exemplary environment in accordance with aspects of the invention.

FIG. 4 shows a block diagram of an exemplary environment in accordance with aspects of the invention. In embodiments, the environment 100 includes a network 140 providing communication between a personal device 110 and an authentication device 150. The network 140 may be any one or more communication networks such as a LAN, WAN, and the Internet, and communications thereof.

In embodiments, the personal device 110 comprises a computing device including one or more elements of the computer system/server 12 of FIG. 1. For example, the personal device 110 comprises a mobile smartphone. In embodiments, the personal device 110 comprises a camera 120, storage 130, and image analysis module 135. The image analysis module 135 may comprise one or more program modules such as program modules 42 described with respect to FIG. 1. Further, the camera 120 includes settings for a user to capture a selfie image. The storage 130 may include hardware and/or software which allows for saving of selfie images and other images The image analysis module 135 performs image decomposition and analysis of a plurality of selfie images and is described in further detail in FIGS. 7 and 8. The personal device 110 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment 100 may include additional devices and/or networks; fewer devices and/or networks; different devices and/or networks; or differently arranged devices and/or networks than illustrated in FIG. 4.

In embodiments, the authentication device 150 comprises a computing device including one or more elements of the computer system/server 12 of FIG. 1. For example, the authentication device 140 comprises a payment device for accepting payment methods (e.g., Apple Pay®, Google Pay™, etc.) from the personal device 110 In another example, the authentication device 150 comprises a virtual machine (VM). In embodiments, and in both examples, the authentication device 150 may comprise one or more program modules such as program modules 42 described with respect to FIG. 1. Further, the authentication device 150 includes hardware and/or software for accepting an authentication action (e.g., payment) and validating the authentication action. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment 100 may include additional devices and/or networks; fewer devices and/or networks; different devices and/or networks; or differently arranged devices and/or networks than illustrated in FIG. 4.

In a cloud implementation, the network 140 comprises or is part of the cloud environment 50 of FIG. 2, the personal device 110 comprises one of the local computing devices 54A-N of FIG. 2, and the authentication device 150 comprises one or more cloud computing nodes 10 of FIG. 2.

With continued reference to FIG. 4, in embodiments, the personal device 110 captures a first selfie image (i.e., an identification profile) using the camera 120 of the personal device 110 and stores the first selfie image in the storage 130 of the personal device 110. In particular, the personal device 110 recognizes a facial geometry, accessories worn (e.g., glasses, earrings, piercings, etc.), hair style (e.g., pony tail, hair up/down, etc.), facial hair (e.g., beard/moustache shape, fullness, etc.), clothing (e.g., hat, necklace, scarf, shirt, etc.), and clothing type (e.g., indoor clothing, outdoor clothing). Each of the recognized elements (e.g., facial geometry, accessories worn, hair style, facial hair, clothing, and clothing type) of the first selfie image is assigned a time-to-live (i.e., a time period where the recognized elements are valid and capable of being stored in the storage 130). Further, the recognized elements include permanent features (e.g., hair, eye color, etc.), ephemeral features (e.g., mask, etc.), and transient features (e.g., clothing, clothing color, etc.). The personal device 110 then receives a validity window (e.g., eight hours or less than twenty four hours) from a user as well as a starting time (e.g., now, tomorrow, etc.) for the validity window. The validity window is the amount of time that the first selfie image is valid and is capable of being stored in the storage 130. The personal device 110 will accept the identification profile based on the first selfie image, recognizing the elements, assigning a time-to-live, and validity window and store this information in the storage 130.

With reference to FIG. 4, in embodiments, the authentication device 150 receives a request for an authentication action (i.e., payment) from the personal device 110. The authentication device 150 then requests the user to take a second selfie image using the camera 120 of the personal device 110. Therefore, the second selfie image is captured using the camera 120 within a predetermined distance from the authentication device 150. The predetermined distance is a geofenced distance that allows for authentication between the personal device 110 and the authentication device 150 through a wireless network. The personal device 110 recognizes elements (e.g., facial geometry, accessories worn, hair style, facial hair, clothing, and clothing type) of the second selfie image. The personal device 110 then compares the recognized elements of the first selfie image with the recognized elements of the second selfie image. In particular, the comparison of the recognized elements of the first selfie image with the recognized elements of the second selfie image will include the personal device 110 determining a level of confidence based on permanent signals of the first selfie image and the second selfie image and non-permanent signals (i.e., ephemeral and transient signals) of the first selfie image and the second selfie image within the validity window. In embodiments, the personal device 110 also uses artificial intelligence (AI) and machine learning algorithms to use prior authorization signals (i.e., prior authorizations of a first selfie image and second selfie image) when determining the level of confidence. The personal device 110 can process the prior authorization signals and determine the level of confidence through AI and machine learning algorithms in the network 140 (e.g., a cloud environment). If the personal device 110 determines that the level of confidence is above a predetermined level, the personal device 110 sends a signal to the authentication device 150 to authenticate the user and approve the authentication action (i.e., payment) within the predetermined distance. In contrast, if the personal device 110 determines that the level of confidence is below the predetermined level, the personal device 110 sends another signal to the authentication device 150 to deny the authentication action (i.e., payment) and deny authentication of the user.

Figure 5:
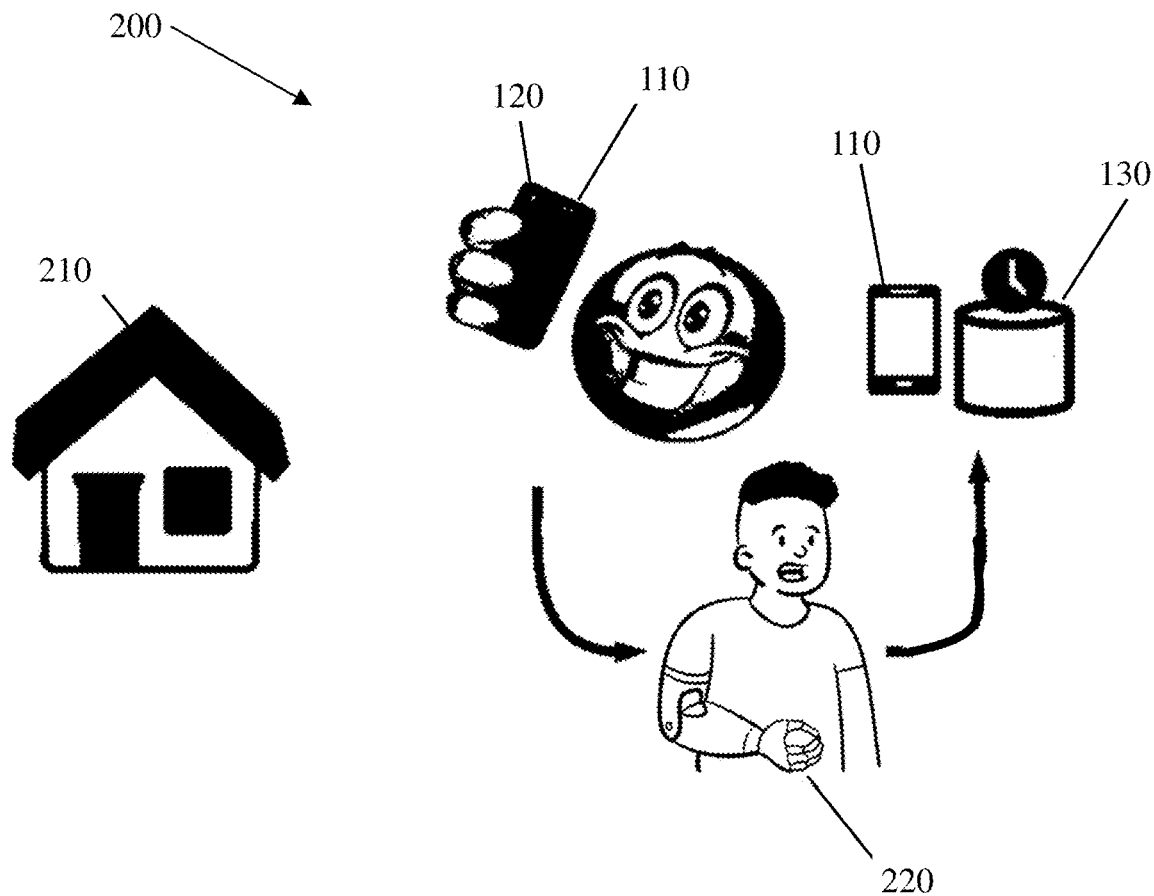
FIG. 5 shows a diagram of a system for setting up an identification profile according to an embodiment of the present invention.

FIG. 5 shows a diagram of a system for setting up an identification profile according to an embodiment of the present invention. In FIG. 5, the system 200 includes a trusted location 210 and a first selfie image 220, along with the personal device 110, the camera 120, and the storage 130 shown in FIG. 4. In FIG. 5, the personal device 110 sets up a short lived identification profile by capturing the first selfie image 220 using the camera 120 of the personal device 110. In embodiments, in FIG. 5, the personal device 110 sets up the short lived identification profile by capturing the first selfie image 220 in a trusted location 210 (e.g., a home). After the first selfie image 220 is captured by the camera 120 the first selfie image 120 is stored in the storage 130 of the personal device 110. In an embodiment, the storage 130 is temporary storage. In an embodiment, the first selfie image 220 is stored in the storage 130 for a temporary time period (i.e., eight hours or less than twenty-four hours). Thus, in an embodiment, the short-lived identification profile is stored and valid for only the temporary time period.

Figure 6:
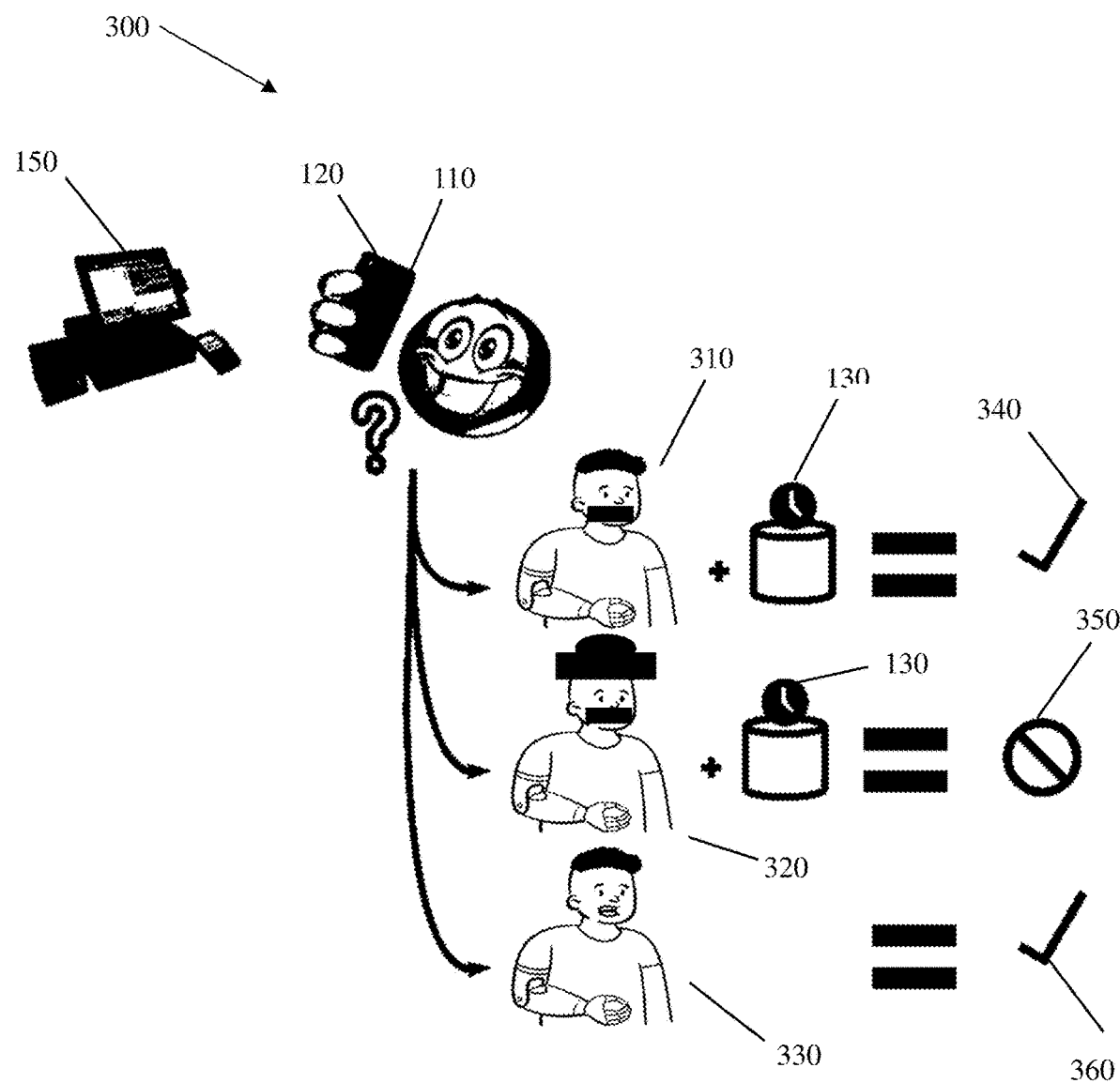
FIG. 6 shows a diagram of a system for validating the identification profile according to an embodiment of the present invention.

FIG. 6 shows a diagram of a system for validating the identification profile according to an embodiment of the present invention. In FIG. 6, the system 300 includes examples of second selfie images 310, 320, 330, checkmark success signals 340, 360, and checkmark failure signal 350, along with the personal device 110, the camera 120, and the storage 130 shown in FIG. 4. In the embodiments, in FIG. 6, the personal device 110 requests an authentication action (i.e., payment) by the authentication device 150. When the personal device 110 requests the authentication action, the authentication device 150 requests the user to take a second selfie image 310 using the camera 120. As an example, the user may want to make a payment for an item in a retail store. In this situation, the personal device 110 of the user requests a payment to be made through the authentication device 150. However, as the authentication device 150 needs to authenticate the user, the authentication device 150 will need to validate and authenticate the user. Therefore, as a first step, the authentication device 150 requests the user to take the second selfie image 310 using the camera 120 such that a comparison can be made between recognized elements of the first selfie image 220 and the second selfie image 310. The second selfie image 310 is then stored in the storage 130 after the second selfie image 310 is captured The personal device 110 then compares the recognized elements of the first selfie image 220 with the recognized elements of the second selfie image 310. In particular, the comparison of the recognized elements of the first selfie image 220 with the recognized elements of the second selfie image 310 will include the personal device 110 determining a level of confidence based on permanent signals of the first selfie image 220 and the second selfie image 310 and non-permanent signals (i.e., ephemeral and transient signals) of the first selfie image 220 and the second selfie image 310 within the temporary time period (i.e., validity window). In embodiments, similar to FIG. 4, the personal device 110 also uses artificial intelligence (AI) and machine learning algorithms with prior authorization signals (i.e., prior authorizations of the first selfie image 220 and second selfie image 310) when determining the level of confidence. In this example, the personal device 110 determines that the level of confidence is above a predetermined level based on a comparison of the non-permanent signals (i.e., ephemeral and transient signals, such as hair length, hair style, and clothes worn) between the first selfie image 220 and the second selfie image 310. Further, the personal device 110 sends a checkmark success signal 340 to the authentication device 150 to authenticate the user and approve the authentication action (i.e., payment). In particular, the checkmark success signal 340 indicates that the level of confidence is above the predetermined level based on the comparison. Further, the personal device 110 sends the checkmark success signal 340 to the authentication device 150 to authenticate the user through any wireless network.

In another example of the embodiments, in FIG. 6, when the personal device 110 requests an authentication action (i.e., payment) by the authentication device 150, the authentication device 150 requests the user to take second selfie image 320 using the camera 120. The second selfie image 320 is then stored in the storage 130 after the second selfie image 320 is captured using the camera 120. The personal device 110 then compares the recognized elements of the first selfie image 220 with the recognized elements of the second selfie image 320 in a similar manner as the comparison of the first selfie image 220 with the second selfie image 310. In this specific example, the personal device 110 determines that the level of confidence is below a predetermined level based on a comparison of the non-permanent signals (i.e., ephemeral and transient signals, such as hair length, hair style, and clothes worn) between the first selfie image 220 and the second selfie image 320. Further, the personal device 110 sends a checkmark failure signal 350 to the authentication device 150 to prevent the user from performing the authentication action (i.e., payment). In particular, the level of confidence is below the predetermined level because the non-permanent signals (i.e., ephemeral and transient signals, such as hair length, hair style, and clothes worn) of the first selfie image 220 do not match the non-permanent signals (i.e., ephemeral and transient signals, such as hair length, hair style, and clothes worn) of the second selfie image 320. In particular, the checkmark failure signal 350 indicates that the level of confidence is below the predetermined level based on the comparison. Further, the personal device 110 sends the checkmark failure signal 350 to the authentication device 150 through any wireless network to prevent the user from performing the authentication action.

In another example of the embodiments, in FIG. 6, when the personal device 110 requests an authentication action (i.e., payment) by the authentication device 150, the authentication device 150 requests the user to take second selfie image 330 using the camera 120. The second selfie image 330 is then stored in the storage 130 after the second selfie image 330 is captured using the camera 120 The personal device 110 then compares the recognized elements of the first selfie image 220 with the recognized elements of the second selfie image 330 in a similar manner as the comparison of the first selfie image 220 with the second selfie image 310. In this specific example, the personal device 110 determines that the level of confidence is above a predetermined level based on a comparison of the permanent signals (i.e., distance between eyes, mouth, nose, gender, etc.) without needing any of the non-permanent signals (i.e., ephemeral and transient signals, such as hair length, hair style, and clothes worn) between the first selfie image 220 and the second selfie image 330. Therefore, the personal device 110 sends a checkmark success signal 360 to the authentication device 150 to authenticate the user and approve the authentication action (i.e., payment). In particular, the level of confidence is above the predetermined level because the permanent signals (i.e., distance between eyes, mouth, nose, gender, etc.) of the first selfie image 220 and the second selfie image 330 match without needing to take into account the non-permanent signals (i.e., ephemeral and transient signals, such as hair length, hair style, and clothes worn). In particular, the checkmark success signal 360 indicates that the level of confidence is above the predetermined level based on the comparison. Further, the personal device 110 sends the checkmark success signal 360 to the authentication device 150 to authenticate the user through any wireless network.

Figure 7:
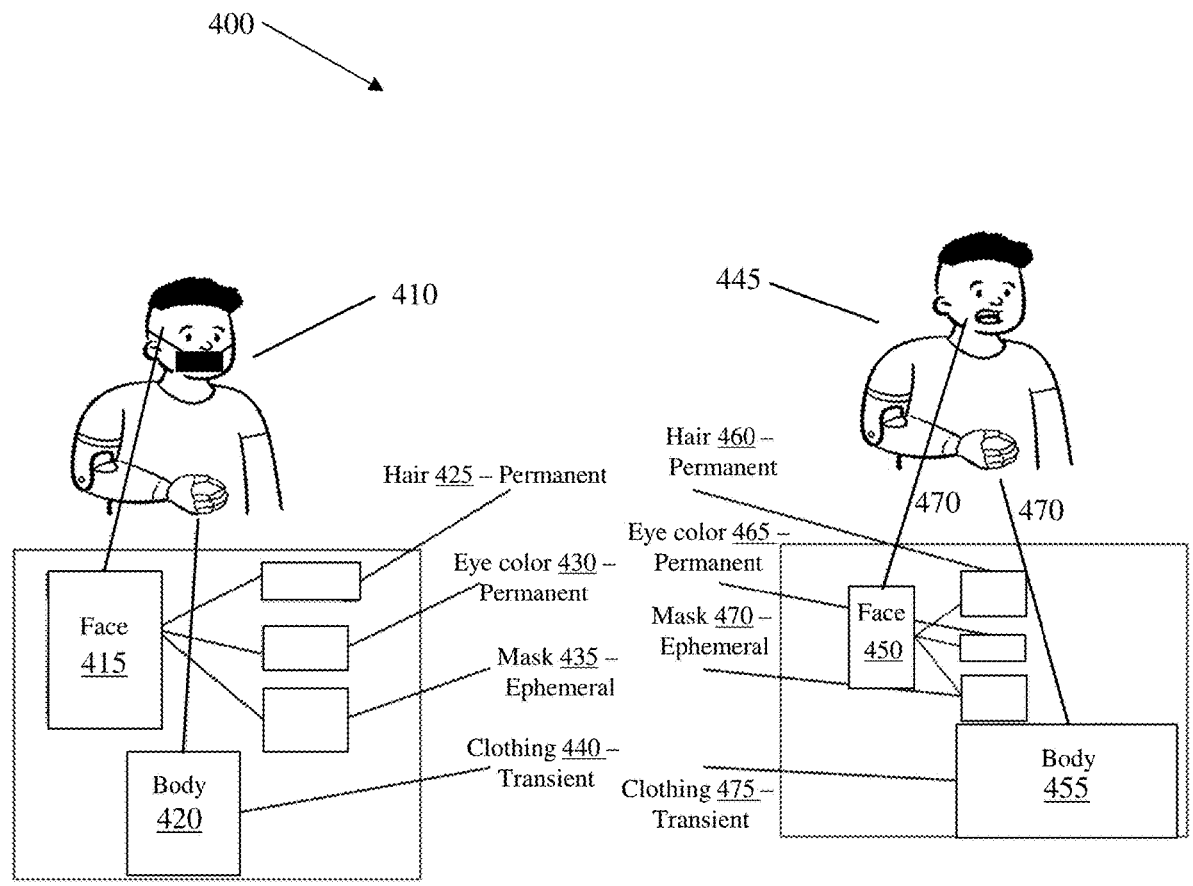
FIGS. 7 and 8 show examples of image decomposition and analysis in accordance with aspects of the invention.
Figure 8:
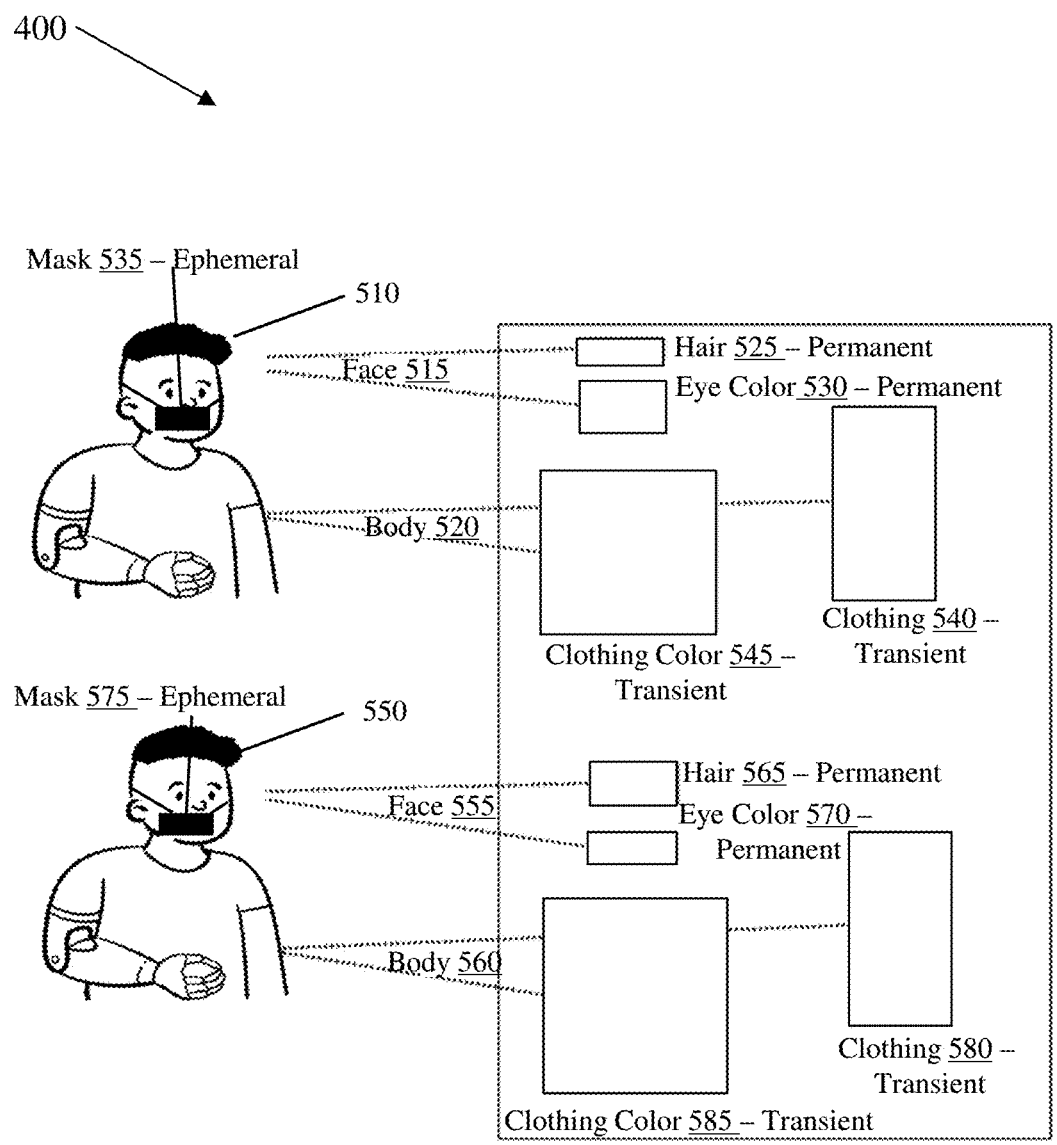

FIGS. 7 and 8 show examples of image decomposition and analysis in accordance with aspects of the invention. For example, FIGS. 7 and 8 shows details of how the personal device 110 compares a first image with a second image using image decomposition and analysis performed by the image analysis module 135 of FIG. 4. In a specific example, FIGS. 7 and 8 describe the details of how the recognized elements of the first selfie image 220 are compared with the recognized elements of the second selfie images 310, 320, and 330 in FIG. 6 using image decomposition and analysis performed by the image analysis module 135 of FIG. 4. In particular, FIG. 7 shows the details of how the personal device 110 performs augmented user authentication of selfie images by decomposing and analyzing the first selfie image 410 with the second selfie image 445. In an image decomposition and analysis 400, the personal device 110 decomposes the first selfie image 410 and the selfie image 445 into different decomposed face images 415, 450 and body images 420, 455. In embodiments, the personal device 110 analyzes each part of the decomposed face images 415, 450 and body images 420, 455 separately in order to extract specific personal features: permanent features (e.g., hair 425, 460, eye color 430, 465), ephemeral features (e.g., mask 435, 470), and transient features (e.g., clothing 440, 475). Further, the personal device 110 assigns a weight to each of the specific personal features 425, 430, 435, 440, 460, 465, 470, and 475 and correlates the visual information with predefined features. The personal device 110, after getting final data (e.g., permanent features, ephemeral features, and transient features) from a previous analysis, compares the final data from the previous analysis with current data (e.g., permanent features, ephemeral features, and transient features) based on a matching analysis.

With reference to FIG. 7, in embodiments, the personal device 110 evaluates each specific personal feature based on the categories of the specific personal features. For example, permanent features will have a higher value than transient or ephemeral features. The personal device 110 ranks information based on a weighted feature clustered analysis. For example, the permanent features will be ranked higher than transient or ephemeral features. Based on a previous analysis, the personal device 110 compares the first selfie image 410 to second selfie image 445 based on matching feature extraction image analysis to provide insights about how different clustered personal features are. The personal device 110 compares the clustered personal features to an expected threshold (which is set by business needs). The personal device 110 then authorizes or denies the authentication action (e.g., payment) based on the expected threshold.

In particular, FIG. 8 shows the details of how the personal device 110 performs augmented user authentication of selfie images by decomposing and analyzing the first selfie image 510 with the second selfie image 550. In the image decomposition and analysis 400, the personal device 110 decomposes the first selfie image 510 and the second selfie image 550 into different decomposed face images 515, 555 and body images 520, 560. In embodiments, the personal device 110 analyzes each part of the decomposed face images 515, 555 and body images 520, 560 separately in order to extract specific personal features: permanent features (i.e., hair 525, 565, eye color 530, 570), ephemeral features (i.e., mask 535, 575), and transient features (i.e., clothing 540, 580, clothing color 545, 585). Further, the personal device 110 assigns a weight to each of the specific personal features 525, 530, 535, 540, 545, 570, 575, 580, and 585 and correlates the visual information with predefined features. The personal device 110, after getting final data (e.g., permanent features, ephemeral features, and transient features) from a previous analysis, compares the final data from the previous analysis with current data (e.g., permanent features, ephemeral features, and transient features) based on a matching analysis.

With reference to FIG. 8, in embodiments, the personal device 110 evaluates each specific personal feature based on the categories of the specific personal features. For example, permanent features will have a higher value than transient or ephemeral features. The personal device 110 ranks information based on a weighted feature clustered analysis. For example, the permanent features will be ranked higher than transient or ephemeral features. Based on a previous analysis, the personal device 110 compares first selfie image 510 to second selfie image 550 based on matching feature extraction image analysis to provide insights about how different clustered personal features are. The personal device 110 compares the clustered personal features to an expected threshold (which is set by business needs). The personal device 110 then authorizes or denies the authentication action (e.g., payment) based on the expected threshold.

Figure 9:
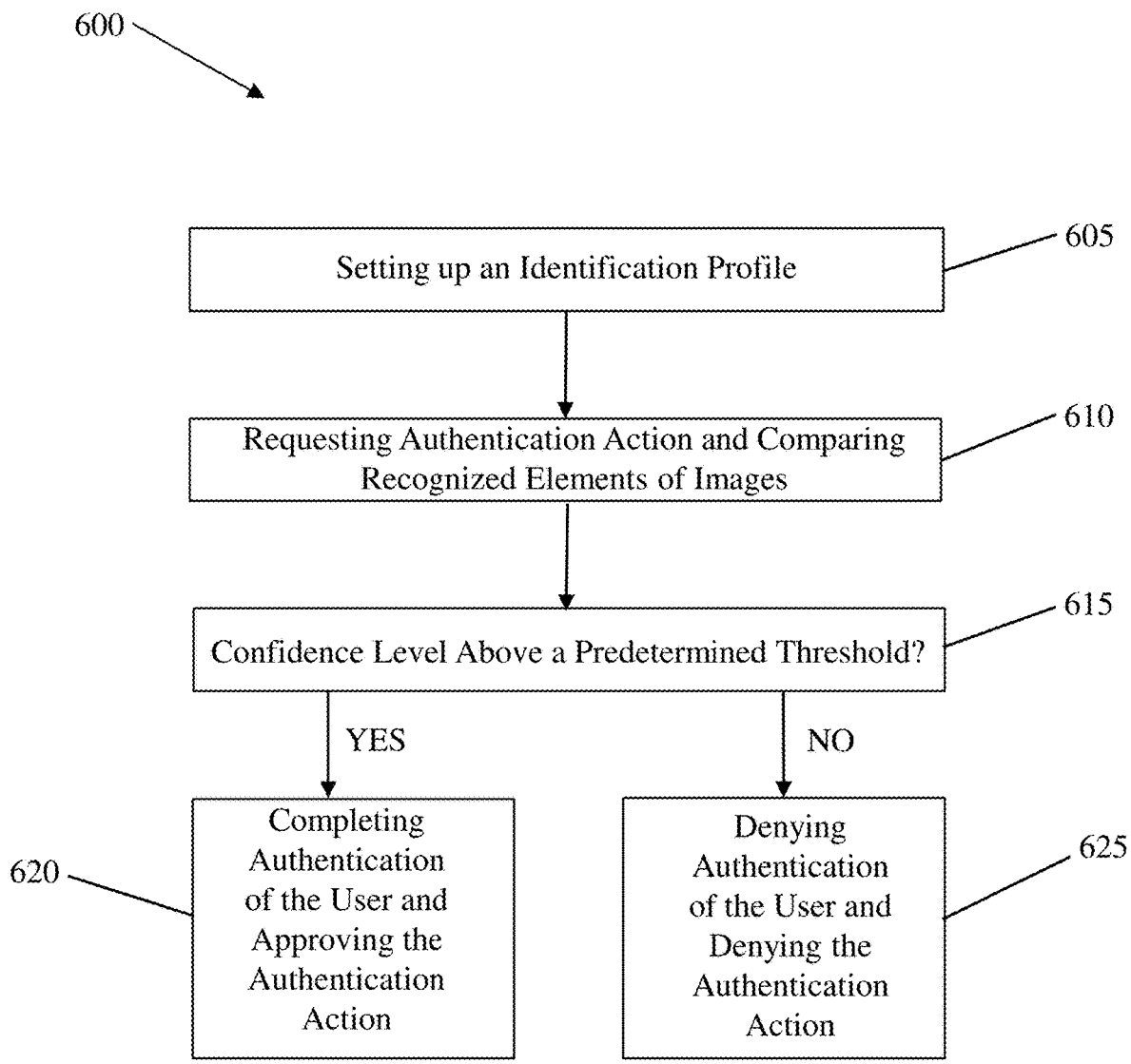
FIG. 9 shows a flowchart of an exemplary method according to embodiments of the present invention.

FIG. 9 shows a flowchart of an exemplary method according to embodiments of the present invention. Steps of the method may be carried out in the environment of FIGS. 4-6 and are described with reference to elements depicted in FIGS. 4-6. In the flowchart 600, at step 605, the personal device 110 sets up an identification profile by capturing a first selfie image using the camera 120 and storing the first selfie image in the storage 130 of the personal device 110. In particular, the personal device 110 recognizes a facial geometry, accessories worn (e.g., glasses, earrings, piercings, etc.), hair style (e.g., ponytail, hair up/down, etc.), facial hair (e.g., beard/moustache shape, fullness, etc.), clothing (e.g., hat, necklace, scarf, shirt, etc.), and clothing type (e.g., indoor clothing, outdoor clothing). Each of the recognized elements (e.g., facial geometry, accessories worn, hair style, facial hair, clothing, and clothing type) of the selfie image is assigned a time-to-live (i.e., a time period where the recognized elements are valid and capable of being stored in the storage 130). The personal device 110 then receives a validity window (e.g., eight hours or less than twenty-four hours) from the user as well as a starting time (e.g., now, tomorrow, etc.) for the validity window. The validity window is the amount of time that the first selfie image is valid and is capable of being stored in the storage 130. The personal device 110 accepts the identification profile based on the first selfie image, recognizing the elements, assigning a time-to-live, and validity window and store this information (i.e., identification profile with the time-to-live and validity window and the recognized elements) in the storage 130.

In the flowchart 600 in FIG. 9, at step 610, the personal device 110 requests an authentication action (i.e., payment) by the authentication device 150. The authentication device 150 requests the user to take a second selfie image using the camera 120. Therefore, the second selfie image is captured using the camera 120 within a predetermined distance from the authentication device 150. The personal device 110 recognizes elements (e.g., facial geometry, accessories worn, hair style, facial hair, clothing, clothing type, etc.) of the second selfie image. The personal device 110 then compares the recognized elements of the first selfie image with the recognized elements of the second selfie image.

In particular, in step 610 of the flowchart 600 in FIG. 9, the comparison of the recognized elements of the first selfie image with the recognized elements of the second selfie image will include the personal device 110 determining a level of confidence based on permanent signals of the first selfie image and the second selfie image and non-permanent signals (i.e., ephemeral and transient signals) of the first selfie image and the second selfie image within the validity window. In embodiments, the personal device 110 also uses artificial intelligence (AI) and machine learning algorithms to use prior authorization signals (i.e., prior authorizations of a first selfie image and second selfie image) when determining the level of confidence. The personal device 110 can process the prior authorization signal and determine the level of confidence through AI and machine learning algorithms in the network 140 (e.g., a cloud environment).

At step 615 of the flowchart 600 in FIG. 9, if the personal device 110 determines that the level of confidence is above a predetermined level (i.e., "YES"), the personal device 110 sends a signal to the authentication device 150 to authenticate the user and approve the authentication action (i.e., payment) within the predetermined distance at step 620. In contrast, if the personal device 110 determines that the level of confidence is below the predetermined level (i.e., "NO"), the personal device 110 sends another signal to the authentication device 150 to deny the authentication action (i.e., payment) and deny authentication of the user at step 625.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
setting up, by a computing device, an identification profile by capturing a first image using a camera of the computing device;
requesting, by the computing device, an authentication action of the first image by an authentication device;
comparing, by the computing device, recognized weighted elements of the first image and a second image, the recognized weighted elements of the first image and the second image including ephemeral features and transient features, the recognized weighted elements including the ephemeral and transient features are weighted based on a permanence level of the ephemeral and transient features such that higher permanence feature levels of the ephemeral and transient features are weighted higher than lower permanence feature levels of the ephemeral and transient features, and the ephemeral features and the transient features comprise hair length, hair style, clothes worn, and a mask which covers a mouth and a nose;
determining, by the computing device, whether a confidence level is above a predetermined threshold based on a comparison of the recognized weighted elements of the first image and the second image;
completing, by the computing device, authentication of the first image by the computing device with the authentication device in response to a determination that the confidence level is above the predetermined threshold, the confidence level is determined using artificial intelligence (AI) and machine algorithms using prior authorization signals which provide prior authorization of the ephemeral and the transient features of the first image and the second image; and
sending, by the computing device, a result of the authentication of the first image to another device,
wherein the higher permanence features levels of the ephemeral and transient features correspond with the ephemeral and transient features that have a higher timespan of remaining unchanged than the lower permanence feature levels of the ephemeral and transient features which correspond with the ephemeral and transient features that have a lower timespan of remaining unchanged.

2. The method of claim 1, further comprising denying, by the computing device, the authentication of the computing device with the authentication device in response to the determination that the confidence level is below the predetermined threshold.

3. The method of claim 1, wherein the result of the authentication of the first image comprises a signal to deny the authentication action of the first image in response to the determination that the confidence level is below the predetermined threshold, and the first image is a first selfie image which is captured by the camera in a trusted location.

4. The method of claim 1, further comprising capturing, by the computing device, the second image using the camera of the computing device.

5. The method of claim 4, wherein the second image is a second selfie image which is captured by the camera within a predetermined distance of the authentication device.

6. The method of claim 1, wherein the identification profile is stored within a storage device of the computing device within a predetermined validity window.

7. The method of claim 6, wherein the predetermined validity window is a time period which is less than twenty-four hours.

8. The method of claim 1, wherein the authentication action is a payment.

9. The method of claim 1, wherein the recognized weighted elements are visual elements of the first image and the second image.

10. The method of claim 9, wherein the visual elements include permanent features of the first image and the second image.

11. The method of claim 10, wherein the confidence level is above the predetermined threshold in response to the ephemeral features and transient features of the first image matching the ephemeral features and transient features of the second image and the permanent features of the first image not matching the permanent features of the second image.

12. A computer program product comprising one or more non-transitory computer readable storage media having program instructions collectively stored on the one or more non-transitory computer readable storage media, the program instructions executable to:
set up an identification profile by capturing a first image using a camera of a computing device;
request an authentication action of the first image by an authentication device;
compare recognized weighted elements of the first image and a second image, the recognized weighted elements of the first image and the second image including ephemeral features and transient features, the recognized weighted elements including the ephemeral and transient features are weighted based on a permanence level of the ephemeral and transient features such that higher permanence feature levels of the ephemeral and transient features are weighted higher than lower permanence feature levels of the ephemeral and transient features, and the ephemeral features and the transient features comprise hair length, hair style, clothes worn, and a mask which covers a mouth and a nose;
determine whether a confidence level is above a predetermined threshold based on a comparison of the recognized weighted elements of the first image and the second image;
complete authentication of the first image by the computing device with the authentication device in response to a determination that the confidence level is above the predetermined threshold, the confidence level is determined using artificial intelligence (AI) and machine algorithms using prior authorization signals which provide prior authorization of the ephemeral and the transient features of the first image and the second image; and
sending, by the computing device, a result of the authentication of the first image to another device,
wherein the higher permanence features levels of the ephemeral and transient features correspond with the ephemeral and transient features that have a higher timespan of remaining unchanged than the lower permanence feature levels of the ephemeral and transient features which correspond with the ephemeral and transient features that have a lower timespan of remaining unchanged.

13. The computer program product of claim 12, wherein the program instructions are executable to deny the authentication of the computing device with the authentication device in response to the determination that the confidence level is below the predetermined threshold.

14. The computer program product of claim 13, wherein the result of the authentication of the first image comprises a signal to approve the authentication action of the first image in response to the determination that the confidence level is above the predetermined threshold, and wherein the first image is a first selfie image which is captured by the camera in a trusted location and the second image is a second selfie image which is captured by the camera within a predetermined distance of the authentication device.

15. The computer program product of claim 13, wherein the result of the authentication of the first image comprises a signal to deny the authentication action of the first image in response to the determination that the confidence level is below the predetermined threshold, and wherein the recognized weighted elements are visual elements of the first image and the second image, the visual elements include permanent features of the first image and the second image, and the confidence level is above the predetermined threshold in response to the ephemeral features and transient features of the first image matching the ephemeral features and transient features of the second image.

16. A system comprising:
a processor, a computer readable memory, one or more computer readable storage media, and program instructions collectively stored on the one or more computer readable storage media, the program instructions executable to:
set up an identification profile by capturing a first image using a camera of a computing device;
request an authentication action of the first image by an authentication device;
compare recognized weighted elements of the first image and a second image, the recognized weighted elements of the first image and the second image including ephemeral features and transient features, the recognized weighted elements including the ephemeral and transient features are weighted based on a permanence level of the ephemeral and transient features such that higher permanence feature levels of the ephemeral and transient features are weighted higher than lower permanence feature levels of the ephemeral and transient features, and the ephemeral features and the transient features comprise hair length, hair style, clothes worn, and a mask which covers a mouth and a nose;
determine whether a confidence level is above a predetermined threshold based on a comparison of the recognized weighted elements of the first image and the second image;
complete authentication of the first image by the computing device with the authentication device in response to a determination that the confidence level is above the predetermined threshold, the confidence level is determined using artificial intelligence (AI) and machine algorithms using prior authorization signals which provide prior authorization of the ephemeral and the transient features of the first image and the second image; and
sending, by the computing device, a result of the authentication of the first image to another device, the result of the authentication of the first image comprises a signal to approve the authentication action of the first image in response to the determination that the confidence level is above the predetermined threshold,
wherein the higher permanence features levels of the ephemeral and transient features correspond with the ephemeral and transient features that have a higher timespan of remaining unchanged than the lower permanence feature levels of the ephemeral and transient features which correspond with the ephemeral and transient features that have a lower timespan of remaining unchanged.

17. The system of claim 16, wherein the program instructions are executable to deny the authentication of the computing device with the authentication device in response to the determination that the confidence level is below the predetermined threshold.

18. The system of claim 17, wherein the recognized weighted elements are visual elements of the first image and the second image, the visual elements include permanent features of the first image and the second image, and the confidence level is above the predetermined threshold in response to the ephemeral features and transient features of the first image matching the ephemeral features and transient features of the second image.

19. The method of claim 1, wherein the comparing the recognized weighted elements of the first image and the second image further comprises comparing decomposed face images and body images of the first image with the decomposed face images and body images of the second image.

20. The method of claim 1, wherein the result of the authentication of the first image comprises a signal to approve the authentication action of the first image in response to the determination that the confidence level is above the predetermined threshold.

* * * * *